United States Patent Office 3,591,577
Patented July 6, 1971

3,591,577
REACTIVE TRIAZINE CONTAINING
AZO DYESTUFFS
Ugo Moiso, Cesano Maderno, Milan, and Giulio Craia, Saronno, Varese, Italy, assignors to Aziende Colori Nazionali Affini Acna S.p.A., Milan, Italy
No Drawing. Continuation-in-part of abandoned application Ser. No. 349,158, Mar. 3, 1964. This appplication July 19, 1968, Ser. No. 746,002
Int. Cl. C09d 62/08; D06p 1/02
U.S. Cl. 260—153
7 Claims

ABSTRACT OF THE DISCLOSURE

Reactive dyestuffs of the azo or anthraquinone series wherein the dyestuff radical is bonded, through a benzene or naphthalene nucleus, to the radical,

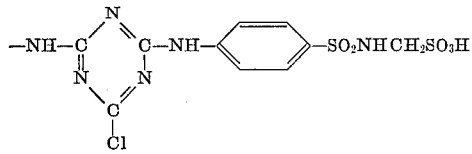

and wherein the dyestuff radical contains 2 or 3 $SO_3H$ substituents as well as at least one substituent selected from the group consisting of —OH, —COOH, —$NH_2$, —$NO_2$, benzoylamino, chlorine, and —$R_3$, —$R_3OH$ and $R_3CONH$— radicals, wherein $R_3$ is an alkyl chain having from 1 to 4 carbon atoms, and metallized complexes of one or two molecules of the foregoing dyestuffs with a heavy metal selected from the group consisting of copper, chromium and cobalt. Cellulose or cotton fabrics dyed with the foregoing dyestuffs.

CROSS-REFERENCE TO RELATED APPLICATION

This application is a continuation-in-part of copending application Ser. No. 349,158, filed Mar. 3, 1964, now abandoned.

BACKGROUND OF THE INVENTION (1) Field of the invention

The present invention relates to a new class of triazine dyestuffs particularly suitable for obtaining dyeings which are fast to wet treatments.

A further object of the present invention is a process for dyeing materials, particularly cellulose materials, with baths containing a dyestuff belonging to the above mentioned class.

(2) Description of the prior art

It is known that reactive dyestuffs belong to a class of dyestuffs capable of forming with the fiber, during the dyeing process, chemical bonds which result in dyeings which are particularly fast to wet treatments.

Among the known classes of dyestuffs having reactive groups, the cyanuryl chloride derivatives, having the general Formula I:

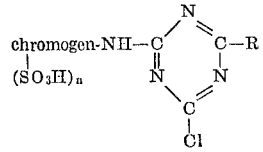

(I)

wherein $n$ generally is 2 or 3 and R is

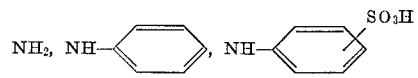

or another analogous group, are particularly suitable.

These dyestffs react with the fibers, and particularly with cellulose fibers, by means of the chlorine atom bound to the cyanuryl nucleus. In order to achieve good dyeing fastness, it is necessary for said dyestuffs to contain various solubilizing groups which decreased their affinity (generally sulfonic acid radicals), so as to allow a complete removal from the fiber of those dyestuff fractions which, instead of reacting, undergo hydrolysis and therefore dye as a direct dyestuff.

As employed in this specification, the designation —$SO_3H$ is intended to also include the analogous radicals wherein the hydrogen is replaced by a monovalent metal, as by "salting out," e.g., —$SO_3Na$, $SO_3K$, etc.

British Pat. 901,434 and French Pat. 1,256,161 disclose azo dyestuffs which are chlorinated triazine derivatives containing at least two reactive groups and which may or may not contain solubilizing groups. Some of these dyestuffs contain the radical (II):

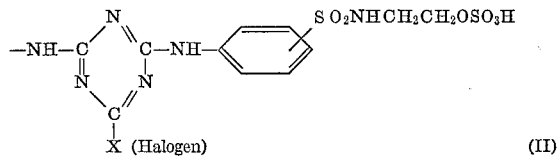

(II)

SUMMARY OF THE INVENTION

We have now discovered that surprisingly superior reactive dyestuffs are non-metallized azo, metallized azo, and anthraquinone dyestuffs which contain (1) a single reactive group (one chlorine bonded to the triazine nucleus), (2) two or three $SO_3H$ solubilizing groups in the dyestuff radical, and (3) the radical (III):

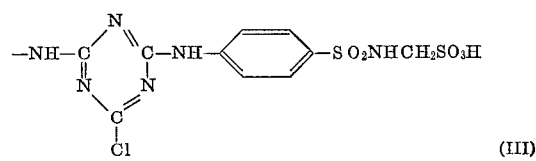

(III)

More particularly, the cyanuryl chloride derivative-containing dyestuffs of the present invention, which are capable of losing a solubilizing group either during or after chemical fixing on the fiber, have the general Formula IV:

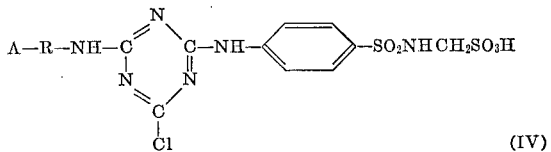

(IV)

wherein R is a benzene or naphthalene radical; A is an anthraquinone radical or $R_2$—N=N—($R_1$—N=N—)$_{m-1}$, wherein $m$ is 1 or 2 and $R_1$ and $R_2$ are selected from the group consisting of benzene, naphthalene and pyrazolone radicals; A and R together contain two or three —$SO_3H$ radicals and at least one substituent selected from the group consisting of —OH, —COOH, —$NH_2$, —$NO_2$, benzoylamino, chlorine, and —$R_3$, —$R_3OH$ and $R_3CONH$— radicals, wherein $R_3$ is an alkyl chain having from 1 to 4 carbon atoms; and when A is $$R_2-N=N-(R_1-N=N-)_{m-1}$$

wherein at least one of R, $R_1$ and $R_2$ contains a radical selected from the group consisting of —OH and —COOH, one or two molecules of the Formula IV may be complexed with a heavy metal selected from the group consisting of copper, chromium and cobalt, at the site of said —OH and —COOH radicals.

DESCRIPTION OF THE PREFERRED EMBODIMENTS

The dyestuffs of the present invention are easier to prepare and less expensive to obtain than the dyestuffs of British Pat. 901,434 containing the radical (II) both because the dyestuffs of the present invention are prepared from more readily available, simpler starting materials and because they can be obtained in higher yields. They provide dyeing results which are at least as good as, or better than, these prior art dyestuffs. Moreover, as is well known, the mechanism of reaction of the radical (II) with the fibers is markedly different from the reaction mechanism of the radical (III), radical (III) reacting only through the halogen atom on the triazine nucleus. By contrast, radical (II) can also react with the fiber through the

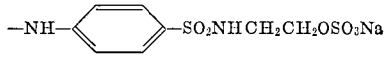

substituent, whereas the analogous

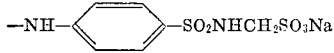

substituent of radical (III) of the present invention functions only to confer controlled solubility and affinity characteristics to the dyestuff.

The advantage presented by the dyestuffs of the present invention with respect to those having the general Formula I are: (a) improved solubility during application; said improved solubility and lower affinity towards the cellulose is evidenced by their ascending paper chromatograms developed by water, wherein it is observed that the spots of dyestuffs (IV) have an Rf (see Lederer, Chromatographie en Chimie Organique et Biologique, vol. I, p. 155) higher than those of the dyestuffs (I); and (b) slightly better fastnesses to wet treatments with phenyl-sulfonate in the nucleus (the solubilizing methanesulfonate group is hydrolyzed during the application).

The dyeing of materials, in particular of cellulose materials, with the dyestuffs of the present invention is carried out according to known techniques, for instance according to known techniques, for instance according to the dyeing processes outlined in Kirk-Othmer's "Encyclopedia of Chemical Technology," 2nd ed., 7, pp. 565 and 566.

The following examples are presented to illustrate the invention without limiting its scope. (All parts are by weight, unless otherwise indicated.)

EXAMPLE 1

4.62 grams (0.025 g. mol) of cyanuryl chloride in 25 grams of acetone were poured onto 30 grams of ice and 20 grams of water. After 3–5 minutes of stirring while maintaining the temperature below 2 to 3° C. by means of suitable additions of finely ground ice, a solution, at a pH of 7, of 6.65 grams (0.025 g. mol) of sulfanilamidomethanesulfonic acid (prepared according to BIOS, 766, pp. 147–150) and 2 grams of sodium carbonate in 100 ml. of cold water was added over 15–20 minutes. By gradual dropwise addition of 12–13 ml. of an aqueous 10% w./v. solution of sodium carbonate, the pH of the milky suspension was constantly maintained between 5.0 and 5.5.

After 1 to 1.5 hours of stirring at 0–3° C., the pH being definitely stabilized, 11.6 grams (0.025 g. mol) of monoazo compound prepared by coupling in acetate medium the diazo compound of 1 g. mol of 2-amino-4,8-naphthalenedisulfonic acid with 1 g. mol of m-amino-acetanilide and isolating at a pH of 3.0 to 3.5, previously dissolved at a pH of 7 in 200 ml. of water containing 2 grams of sodium carbonate, were added to the above solution. The reaction mixture was heated to about 40° C. and, as soon as this temperature was reached, a solution having an intense orange color was obtained.

After 3 to 3.5 hours of stirring at about 40° C., during which the pH was constantly maintained between 6.0 and 6.5 by gradual dropwise addition of 10–12 ml. of an aqueous 10% w./v. solution of sodium carbonate, the definite stabilization of the pH was obtained.

The resulting dyestuff,

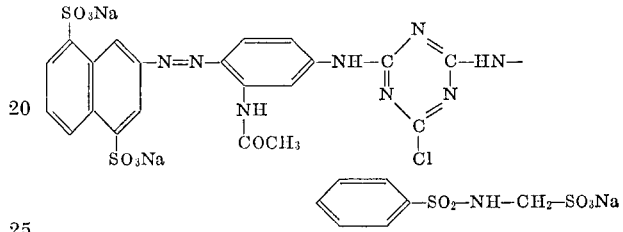

was then precipitated by salting out, filtered under vacuum, allowed to dry as much as possible at ambient conditions, and finally dried in an oven at about 35 to 40° C. for 24 hours. When dissolved in water, the dye yielded a yellow-orange solution which dyed cotton in a yellow shade having good fastness after alkaline thermofixing.

The same dyestuff was obtained by carrying out the condensation in the reverse order, i.e., condensing with the cyanuryl chloride first the monoazo compound and then the sulfanilamidomethanesulfonic acid.

EXAMPLE 2

4.62 grams (0.025 g. mol) of cyanuryl chloride in 25 grams of acetone were poured onto 30 grams of ice and 20 grams of water. While maintaining the temperature below 2 to 3° C., a solution of 6.65 grams (0.025 g. mol) of sulfanilamido-methanesulfonic acid and 2 grams of sodium carbonate in 100 ml. of cold water, having a pH of 7, was added to the above solution over 15 to 20 minutes. After 1 to 1.5 hours of stirring at 0–3° C., during which the pH was constantly maintained between 5.0 and 5.5 by addition of 12–13 ml. of a 10% w./v. solution of sodium carbonate, the stabilization of the pH was obtained.

Then 12.2 grams (0.025 g. mol) of 1 - amino - 4(4'-amino-3'-sulfo-anilino)-anthraquinone - 2 - sulfonic acid, previously dissolved at a pH of 7 in 200 ml. of water containing 3 grams of sodium carbonate, were added to the above solution. The reaction mixture was heated to about 40° C. and, after 2 to 2.5 hours of stirring at this temperature, during which the pH of the solution was constantly maintained between 6.0 and 6.5 by gradual addition of 11–12 ml. of a 10% w./v. solution of sodium carbonate, the stabilization of the pH was obtained.

The dyestuff,

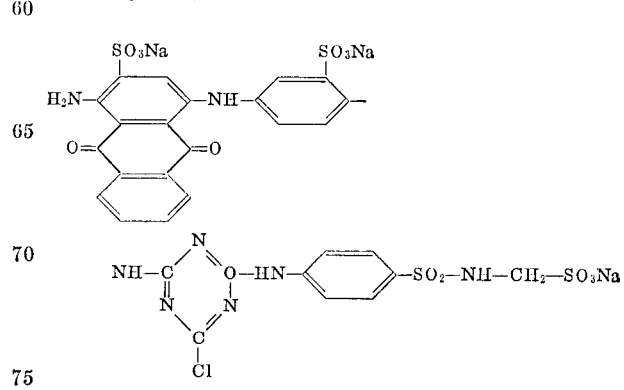

was then precipitated by salting out, filtered under vacuum, allowed to dry as much as possible at ambient conditions, and finally dried in an oven at about 35 to 40° C. for 24 hours.

When dissolved in water, the dyestuff yielded a blue solution which dyed cotton in a blue shade having good fastness after alkaline thermofixing.

EXAMPLE 3

4.62 grams (0.025 g. mol) of cyanuryl chloride in 25 grams of acetone were poured onto 30 grams of ice and 20 grams of water. While maintaining the temperature below 2 to 3° C., a solution of 6.65 grams (0.025 g. mol) of sulfanilamido-methanesulfonic acid in 100 ml. of cold water containing 2 grams of sodium carbonate, having a pH of 7, was added to the above solution. Stabilization of the pH was obtained after 1 to 1.5 hours of stirring at 0 to 3° C., during which time, by dropwise addition of 12–13 ml. of a 10% w./v. solution of sodium carbonate, the pH of the suspension was constantly maintained between 5.0 and 5.5.

Then 13.6 grams (0.025 g. mol) of the disodium salt of the monoazo compound prepared by coupling, in a carbonate medium, the diazo reaction product of 1 g. mol of 2-hydroxy-5-sulfoaniline with 1 g. mol of isogamma acid, metallized with 1 g. mol of crystalline copper sulfate at 90° C. in an ammoniacal medium and isolated by salting out at a pH of 6.5, previously dissolved witth 300 ml. of water, were added to the above solution. The reaction mixture was heated to about 40° C. and, after 3.5 to 4 hours of stirring at this temperature, the stabilization of the pH of the solution, to which had been gradually added 12–13 ml. of a 10% w./v. solution of sodium carbonate in order to maintain the pH between 6.0 and 6.5, was obtained. The dyestuff,

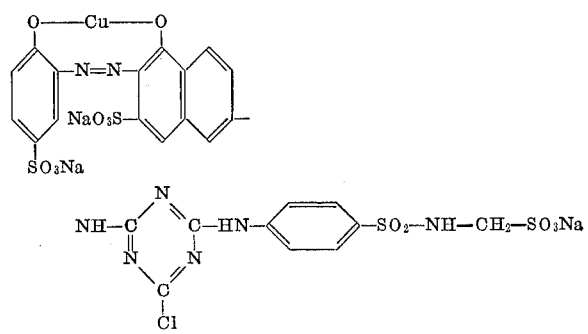

was then precipitated by salting out, filtered under vacuum, allowed to dry as much as possible at ambient conditions, and finally dried in an oven at about 35 to 40° C. for 24 hours.

When dissolved in water, the dyestuff yielded a ruby solution which dyed cotton in a ruby shade having good fastness after alkaline thermofixing.

EXAMPLE 4

4.62 grams (0.025 g. mol) of cyanuryl chloride in 25 grams of acetone were poured onto 30 grams of ice and 20 grams of water. After 3 to 5 minutes of stirring and maintaining the temperature below 2 to 3° C. by means of suitable additions of ice, a solution of 5.98 grams (0.025 g. mol) of isogamma acid and 1.8 grams of sodium carbonate in 100 ml. of water, having a pH of 7, was added, over 15 to 20 minutes, to the above solution. By gradual dropwise addition of 12–13 ml. of a 10% w./v. solution of sodium carbonate, the pH was constantly maintained between 5.5 and 6.0.

After 1 hour of stirring at 0–3° C., the pH being definitely stabilized, a solution of 6.65 grams (0.025 g. mol) of sulfanilamido-methanesulfonic acid and 2 grams of sodium carbonate in 70 ml. of cold water, having a pH of 7, was added to the above solution. The reaction mixture was heated to about 40° C., and while maintaining this temperature constant, the pH was adjusted to between 5.0 and 5.5 by gradual dropwise addition of 11–12 ml. of a 10% w./v. solution of sodium carbonate. When the condensation was completed, 13 grams of sodium bicarbonate were added to this solution at room temperature, and then the diazo compound of 5.75 grams (0.025 g. mol) of 4-amino-acetanilido-3-sulfonic acid in 4–5% w./v. aqueous solution (prepared according to BIOS 1548, p. 48) was added.

The dyestuff,

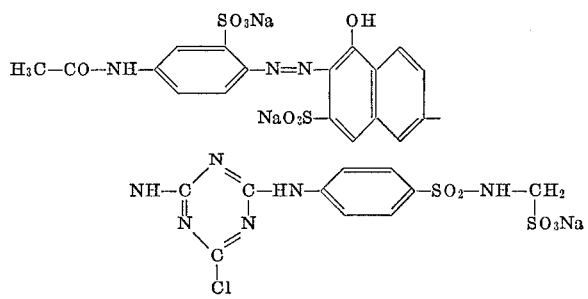

was then precipiated by salting out, filtered under vacuum, allowed to dry as much as possible at ambient conditions, and finally dried in an oven at about 35 to 40° C. for 24 hours. When dissolved in water, the dyestuff yielded a scarlet solution which dyed cotton in a scarlet shade having good fastness after alkaline thermofixing. The same dyestuff was obtained by carrying out the condensation in the reverse order, i.e., condensing with the cyanuryl chloride first the sulfanilamido-methanesulfonic acid and then the isogamma acid.

EXAMPLE 5

4.62 grams (0.025 g. mol) of cyanuryl chloride in 25 grams of acetone were poured onto 30 grams of ice and 20 grams of water. While maintaining the temperature below 2 to 3° C., a solution of 6.65 grams (0.025 g. mol) of sulfanilamido-methanesulfonic acid and 2 grams of sodium carbonate in 100 ml. of cold water, having a pH of 7, was added to the above solution over 15 to 20 minutes. After 1 to 1.5 hours of stirring at 0–3° C., during which the pH was constantly maintained between 5.0 and 5.5 by addition of 12–13 ml. of a 10% w./v. solution of sodium carbonate, the stabilization of the pH was obtained.

Then 4.7 grams (0.025 g. mol) of 3-amino-4-sulfoaniline, previously dissolved in 50 ml. of water, were added the above solution and the reaction mixture heated to about 40° C. After 1 to 1.5 hours of stirring at this temperature, while maintaining the pH of the solution between 6 and 6.5 by gradual dropwise addition of 12–13 ml. of a 10% w./v. solution of sodium carbonate, the stabilization of the pH was obtained. The solution was then cooled to 0 to 3° C. First 1.72 grams (0.025 g. mol) of sodium nitrite (in the form of an aqueous solution having a concentration of 30% w./v.) and then 5.85 grams of hydrochloric acid (21° Bé) were added. After 20 minutes of stirring at 0–5° C., this solution was slowly added to a solution of 8.1 grams of 1-(2′,5′-dichloro-4′- sulfo-phenyl)-3-methyl-5-pyrazolone and 15 grams of sodium carbonate in 100 ml. of water kept at room temperature.

The dyestuff,

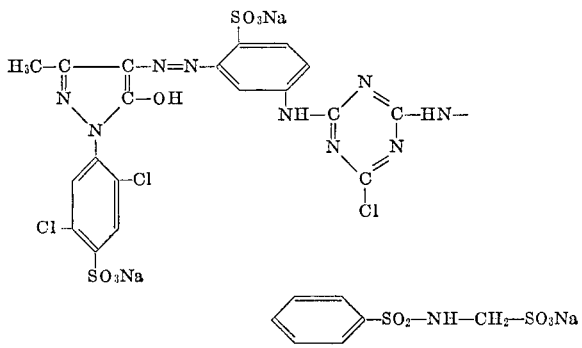

was then completely precipitated by salting out, filtered under vacuum, allowed to dry as much as possible at ambient conditions, and finally dried in an oven at about 35 to 40° C. for 24 hours. When dissolved in water, the dyestuff yielded a lemon-yellow solution which dyed cotton in a yellow shade having good fastness after alkaline thermofixing. The same dyestuff was obtained by carrying out the condensation in the reverse order, i.e., by condensing with the cyanuryl chloride, first the 3-amino-4-sulfoaniline, and then the sulfanilamido-methanesulfonic acid.

EXAMPLE 6

4.62 grams (0.025 g. mol) of cyanuryl chloride in 25 grams of acetone were poured onto 30 grams of ice and 20 grams of water. While maintaining the temperature below 2 to 3° C., a solution of 6.65 grams (0.025 g. mol) of sulfanilamido-methanesulfonic acid and 2 grams of sodium carbonate in 100 ml. of cold water, having a pH of 7, was added to the above solution over 15–20 minutes. After 1 to 1.5 hours of stirring at 0 to 3° C., during which the pH was constantly maintained between 5.0 and 5.5 by addition of 12–13 ml. of a 10% w./v. solution of sodium carbonate, the stabilization of the pH was obtained. Then 4.7 grams (0.025 g. mol) of 3-amino-4-sulfoaniline, previously dissolved in 50 ml. of water, was added to the above solution and the reaction mixture heated to about 40° C. After 1 to 1.5 hours of stirring at this temperature, while maintaining the pH of the solution between 6.0 and 6.5 by gradual addition of 12–13 ml. of a 10% w./v. solution of sodium carbonate, the stabilization of the pH was obtained. The solution was then cooled to 0 to 3° C. First 1.72 grams (0.025 g. mol) of sodium nitrite (in the form of an aqueous solution having a concentration of 30% w./v.) and then 5.85 grams of hydrochloric acid (21° Bé.) were added. After 20 minutes of stirring at 0 to 5° C., the solution was slowly added to a solution, kept at room temperature, of 10.6 grams of N-benzoyl-H acid in 100 ml. of water to which had been added 5 ml. of a 10% w./v. solution of sodium carbonate and to which, immediately before the addition of the diazo compound, 13 grams of crystalline sodium acetate had been added.

The precipitation of the dyestuff,

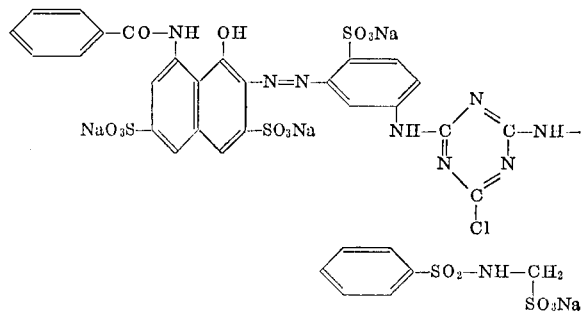

was completed by salting out. Then it was filtered under vacuum, allowed to dry as much as possible, and then dried in an oven at about 35 to 40° C. for 24 hours. When dissolved in water the dyestuff yielded a bluish-red solution which dyed cotton in a red shade having good fastness after alkaline thermofixing.

EXAMPLE 7

Into a suspension consisting of 18.6 grams (0.101 g. mol) of cyanuryl chloride in 150 ml. of water containing 10 drops of an aqueous 5% Emulgator MK solution and 70 grams of ice, kept at 5° C., was added, over 15 minutes, a solution, at a pH of about 6, comprising 26.6 grams (0.100 g. mol) of sulfanilamido-methanesulfonic acid and 6 grams of $Na_2CO_3$ in 300 ml. of water. By addition of ice the temperature was kept at 5° C. The pH was kept constant at about 6 by adding dropwise a 10% w./v. solution of $Na_2CO_3$ both during the addition as well as during the next four hours of stirring, thus obtaining a milky suspension of the compound (V) having the formula:

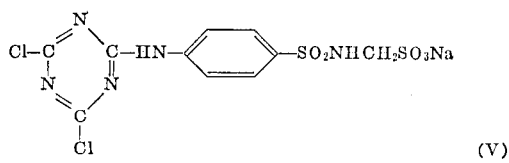

(V)

48.5 grams of the trisodium salt of the diazo compound obtained by coupling, in an aqueous medium buffered at about pH 5 with an acetic acid/sodium acetate mixture, the derivative of aniline 2,5-disulfonic acid with 2-methoxy-5-methylaniline and then the diazo derivative of the obtained monoazo with 1-naphthylamino-6-sulfonic acid, were added to the foregoing suspension, while keeping the pH between 6.5 and 7 by means of a 10% w./v. $Na_2CO_3$ solution. The resulting mixture was heated to 45° C. and maintained at that temperature until complete condensation.

The dyestuff,

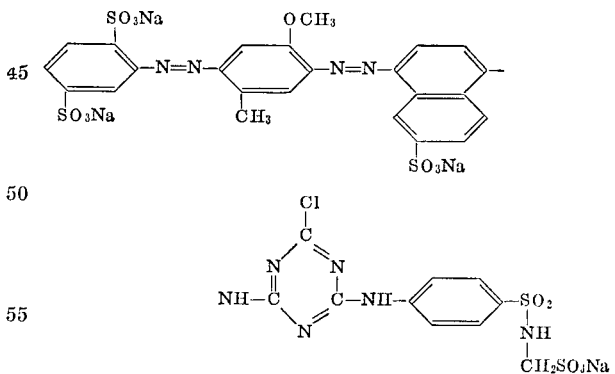

was precipitated, after filtering the condensation solution, at a pH of about 7, by means of NaCl. The precipitated dyestuff was then filtered and dried at 45–50° C. This dyestuff was soluble in water and yielded a reddish brown solution which dyed cotton in a brown shade having good fastness characteristics after alkaline thermofixing.

EXAMPLE 8

2.8 grams of the disodium salt of the monoazo compound obtained by coupling in alkaline medium the diazo derivative of 4-nitro-2-amino phenol with 1-hydroxy-8-amino naphthalene-3,6-disulfonic acid were maintained at the boiling temperature for 5 hours at a pH of 5 to 6 in 600 ml. of water containing 12.9 grams of chromium triacetate (22.2% of Cr). Upon the solution of the chromium 2:1 complex, a suspension of 0.13 g. mol of compound (V), prepared as described in Example 7, was added at a temperature of 25° C. The reaction mixture was then heated to 45° C., while maintaining a pH of 6.5 by means of a 10% w./v. Na$_2$CO$_3$ solution and kept at this temperature and pH until complete condensation.

After clarifying the condensation solution, the dyestuff,

EXAMPLE 9

46.1 grams of the sodium salt of the monoazo compound, obtained by coupling 6-nitro-1-diazo-2-hydroxynaphthalene-4-sulfonic acid with 2-hydroxy-naphthalene, were boiled for 1 hour in 625 ml. of an aqueous solution containing an amount of sodium chromosalicylate, which

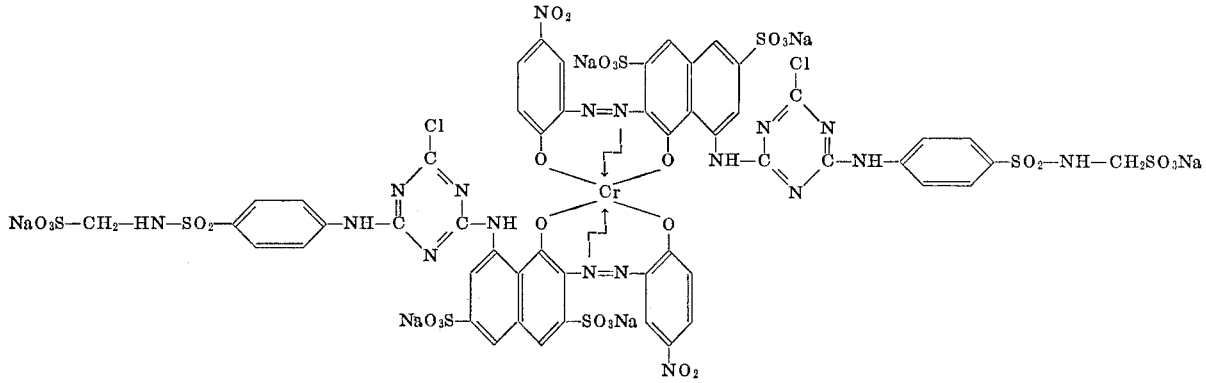

was precipitated at a pH of about 6 by means of NaCl, and then filtered and dried at 40–50° C. This dyestuff was soluble in water, giving an intense blueish solution which dyed cotton in a dark blue shade having good fastness (particularly towards chlorine) after alkaline thermofixing.

By operating analogously as described above, the 2:1 cobalt complex was first prepared by using cobalt sulfate at a pH of about 6 and thereafter the dyestuff, corresponds to 3.25 grams of chromium. Then the temperature of the reaction mass was allowed to drop to 70° C. and a solution consisting of 15.6 grams of Na$_2$S in 65 ml. of water was added and the temperature maintained at 80° C. for an additional 30 minutes. The metallized monoazo compound was isolated by filtration at a pH of about 2.5 and a temperature of 18 to 20° C. The paste thus obtained was dissolved in 400 ml. of water at a pH of 7 and a temperature of 20° C. and then clarified. A

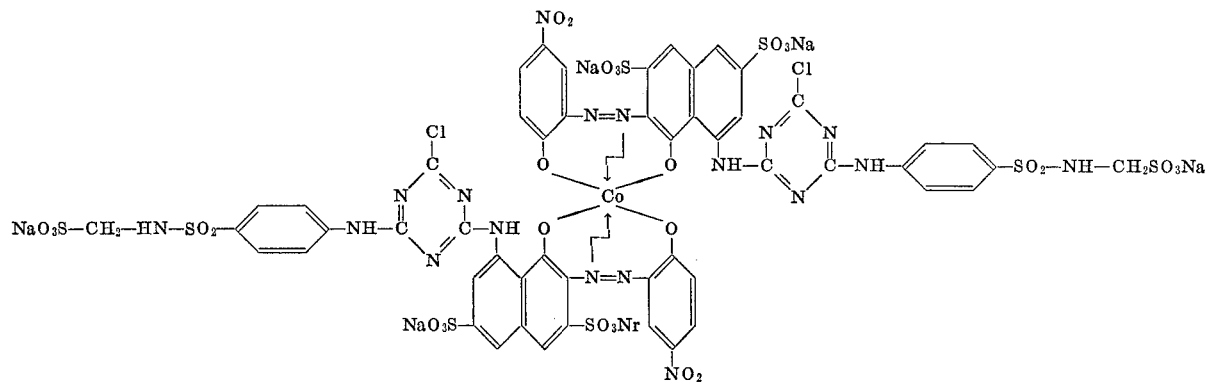

was recovered.

This dyestuff, when dissolved in water, yielded a dark violet solution which dyed cotton violet, while its mixture with 8 times as much of the chromium derivative dyed cotton in a black shade having good fastness characteristics after alkaline thermofixing (particularly towards chlorine).

suspension consisting of 0.13 g. mol of compound (V), obtained as described in Example 7, was then added to the clarified solution. The reaction mixture was heated to 45° C. and maintained at this temperature until complete condensation while maintaining a pH of 6.5 to 7.0 by addition of a 10% w./v. solution of Na$_2$CO$_3$.

After clarifying the condensation solution, the dyestuff,

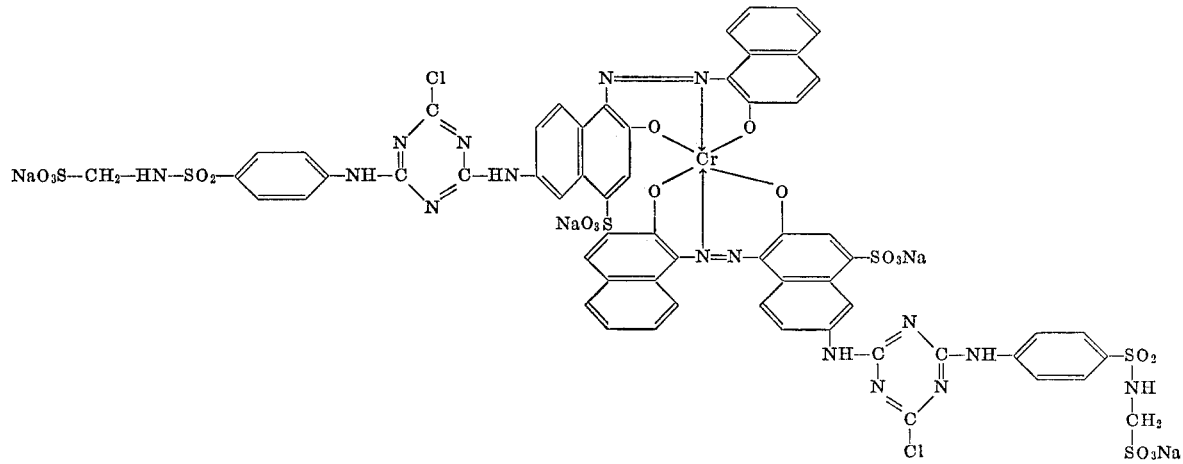

was precipitated at a pH of about 6 by addition of NaCl, then filtered and dried at 40–50° C. This dyestuff dissolved in water, giving a blueish solution which dyed cotton in a brilliant grey shade having good fastness characteristics after alkaline thermofixing.

EXAMPLE 10

A suspension of 0.096 g. mol of compound (V), obtained as described in Example 7, was added to a solution of 25 grams of the sodium salt of 2-amino-5-naphthol-7-sulfonic acid in 240 ml. of water containing about 9 grams of NaHCO₃ as buffering agent. The reaction mixture was heated to 35 to 40° C. over 90 minutes and this temperature was maintained for an additional 2 hours. During this period the pH spontaneously increased slowly from 6.5 to 7.5. The condensate thus obtained was cooled to 2 to 3° C., and 16.6 grams of the diazo compound of aniline-2-sulfonic acid were added, while maintaining the coupling pH between 7 and 8 by means of a 10% w./v. Na₂CO₃ solution and the temperature between 5 and 7° C. by means of ice. The reaction mixture was maintained under agitation overnight. The next day the dyestuff,

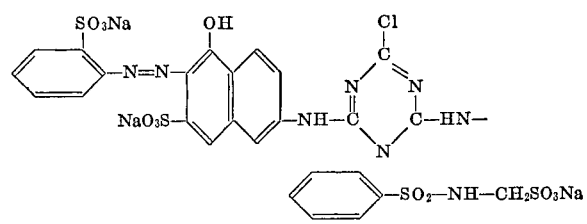

was precipitated at a pH of 6.5 with NaCl after clarifying the coupling solution, filtered, and dried at 40–50° C. This dyestuff dissolved in water, yielding an orange solution which dyed cotton a brilliant orange-yellowish shade having good fastness characteristics (particularly towards chlorine) after alkaline thermofixing.

Variations can, of course, be made without departing from the spirit and scope of this invention.

What we desire to secure by Letters Patent and hereby claim is:

1. A reactive triazine dyestuff selected from the group consisting of dyestuffs having the formula:

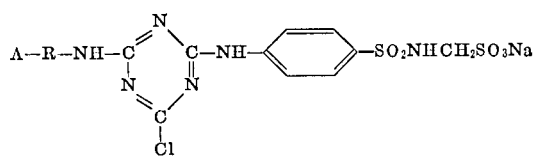

wherein R is a benzene or naphthalene radical, A is R₂—N=N—(R₁—N=N—)ₘ₋₁, wherein $m$ is 1 or 2 and R₁ and R₂ are selected from the group consisting of benzene, naphthalene and pyrazolone radicals, each of R and A contains only substituents selected from the group consisting of —SO₃H, —OH, —COOH, —NH₂, —NO₂, benzoylamino, chlorine, and —R₃, —R₃OH and R₃CONH—, wherein R₃ is an alkyl chain having from 1 to 4 carbon atoms, and A and R together contain two or three —SO₃H radicals and at least one substituent selected from the group consisting of —OH, —COOH, —NH₂, —NO₂, benzoylamino, chlorine, and —R₃, —R₃OH and R₃CONH—, wherein R₃ is an alkyl chain having from 1 to 4 carbon atoms.

2. The dyestuff of claim 1, having the structure:

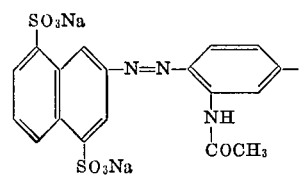

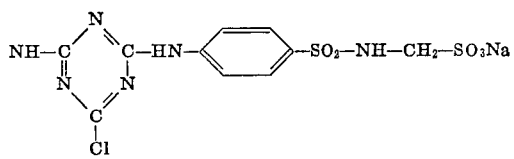

3. The dyestuff of claim 1, having the structure:

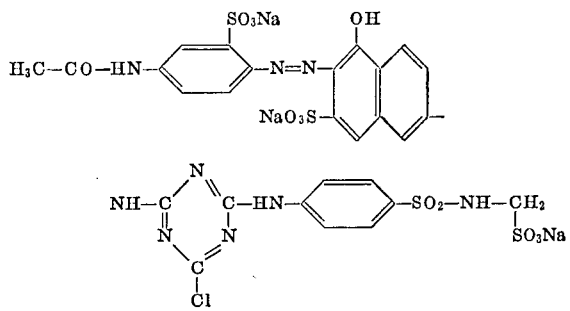

4. The dyestuff of claim 1, having the structure:

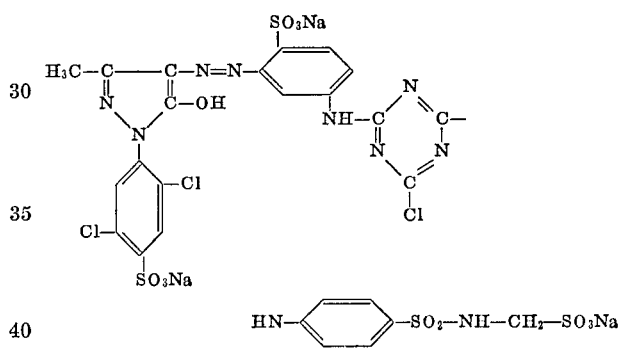

5. The dyestuff of claim 1, having the structure:

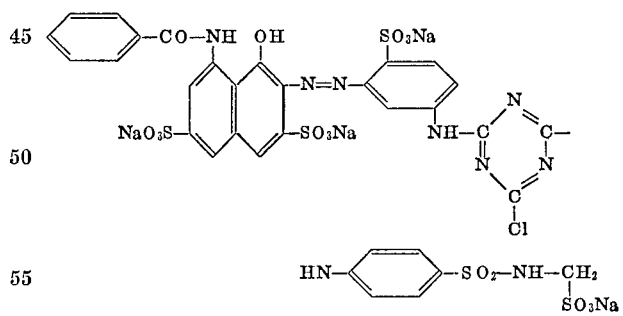

6. The dyestuff of claim 1, having the structure:

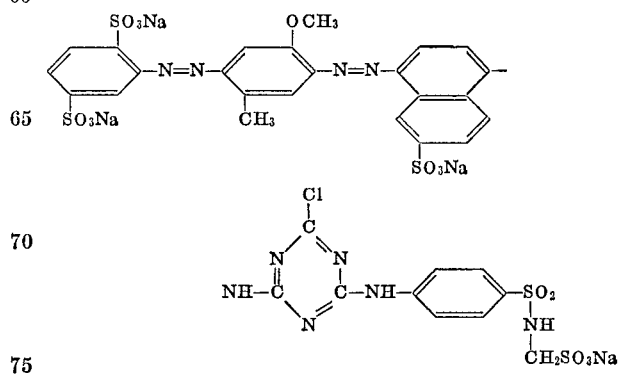

7. The dyestuff of claim 1, having the structure:
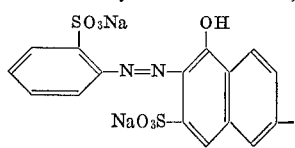
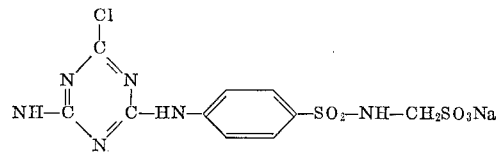
References Cited
UNITED STATES PATENTS
3,429,870  2/1969  Carati et al. _____ 260—153
CHARLES B. PARKER, Primary Examiner
D. M. PAPUGA, Assistant Examiner
U.S. Cl. X.R.
8—54.2; 260—146, 249, 249.5, 249.8

UNITED STATES PATENT OFFICE
CERTIFICATE OF CORRECTION

Patent No. 3,591,577  Dated July 6, 1971

Inventor(s) UGO MOISO et al

It is certified that error appears in the above-identified patent and that said Letters Patent are hereby corrected as shown below:

Column 2, line 11: "decreased" should read --decrease--;

Column 3, line 37: "advantage" should read --advantages--;

Column 4, first structural formula should read:

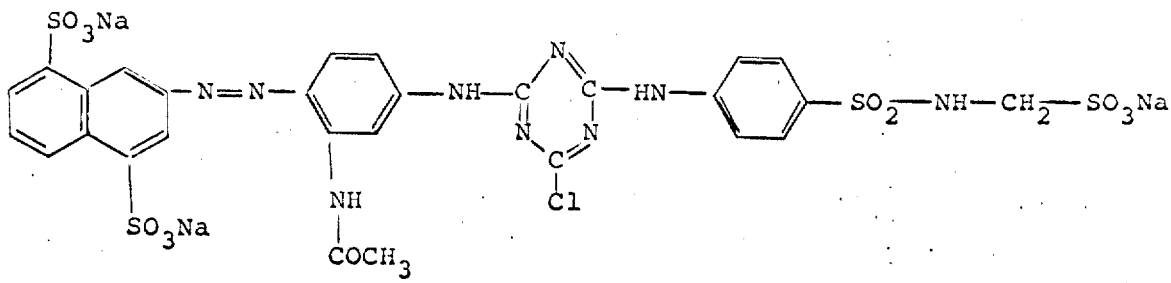

Column 4, line 49: "1-amino- 4(4'-" should read --1-amino -4-(4'- --;

Column 4, second structural formula should read:

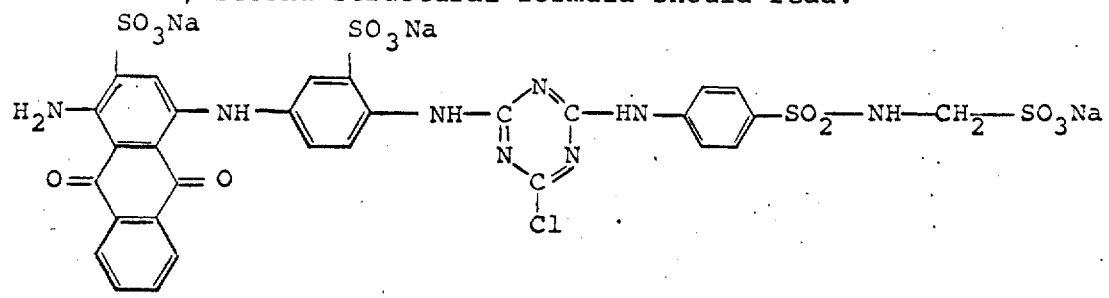

UNITED STATES PATENT OFFICE
CERTIFICATE OF CORRECTION

Patent No. 3,591,577                      Dated  July 6, 1971

Inventor(s)  UGO MOISO et al                      PAGE - 2

It is certified that error appears in the above-identified patent and that said Letters Patent are hereby corrected as shown below:

Column 5, structural formula should read:

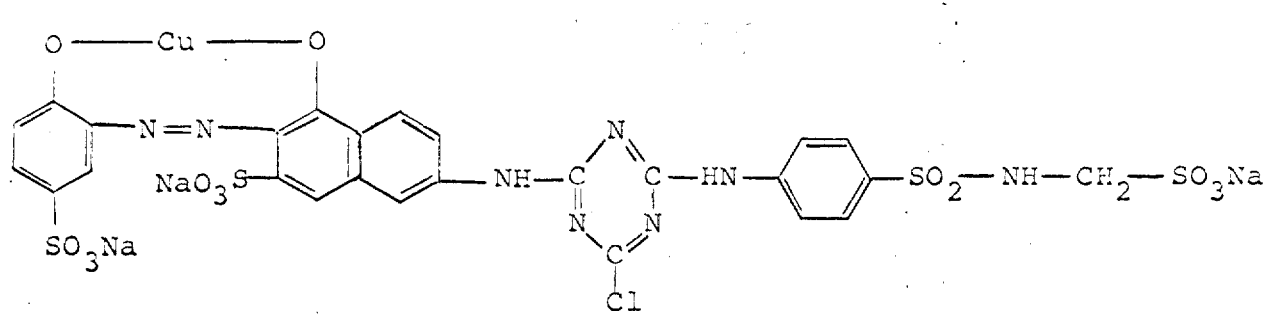

Column 6, structural formula should read:

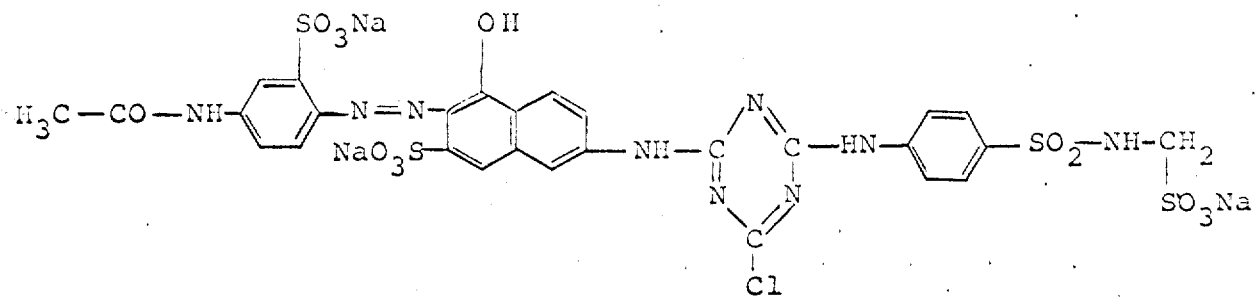

UNITED STATES PATENT OFFICE
CERTIFICATE OF CORRECTION

Patent No. 3,591,577    Dated July 6, 1971

Inventor(s) UGO MOISO et al    PAGE - 3

It is certified that error appears in the above-identified patent and that said Letters Patent are hereby corrected as shown below:

Column 7, first structural formula should read:

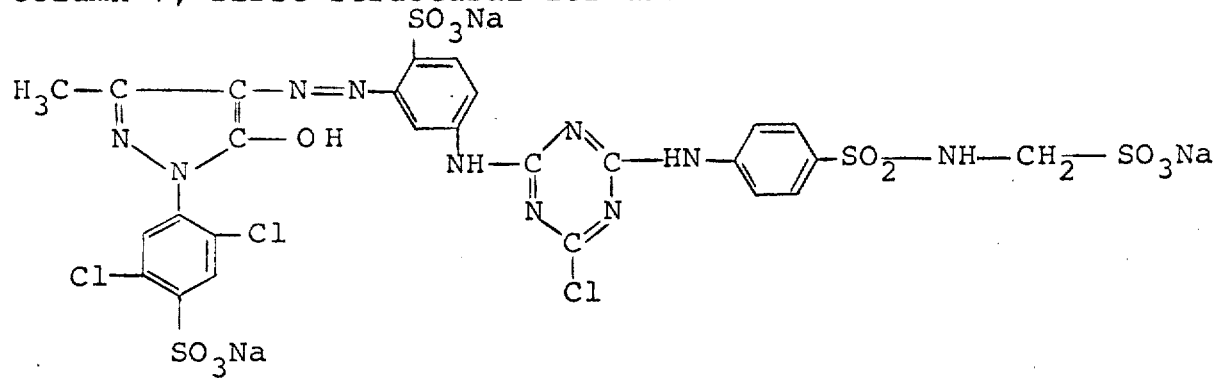

Column 7, second structural formula should read:

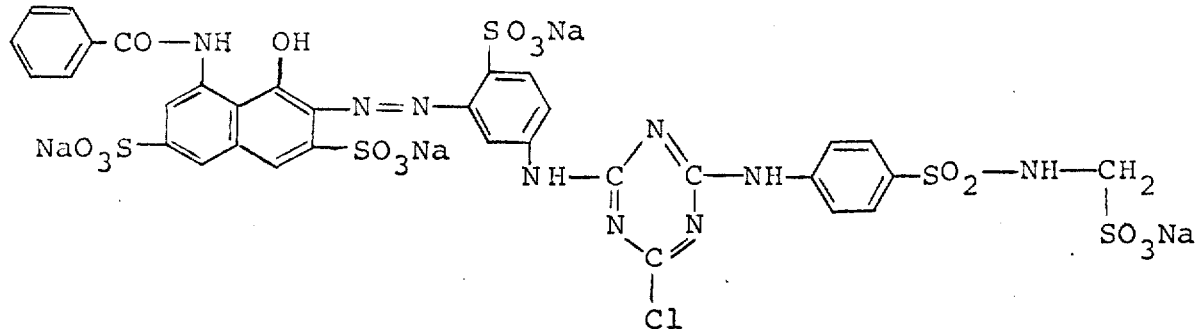

UNITED STATES PATENT OFFICE
CERTIFICATE OF CORRECTION

Patent No. 3,591,577            Dated July 6, 1971

Inventor(s) UGO MOISO et al            PAGE - 4

It is certified that error appears in the above-identified patent and that said Letters Patent are hereby corrected as shown below:

Column 8, second structural formula should read:

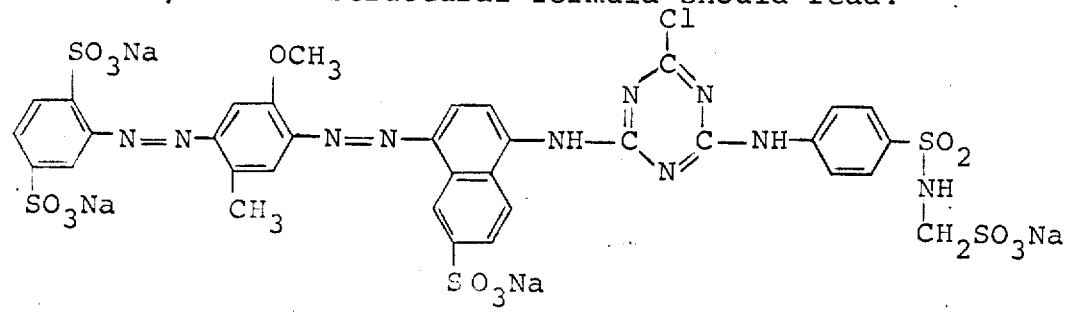

Columns 9 and 10, the second structural formula should read:

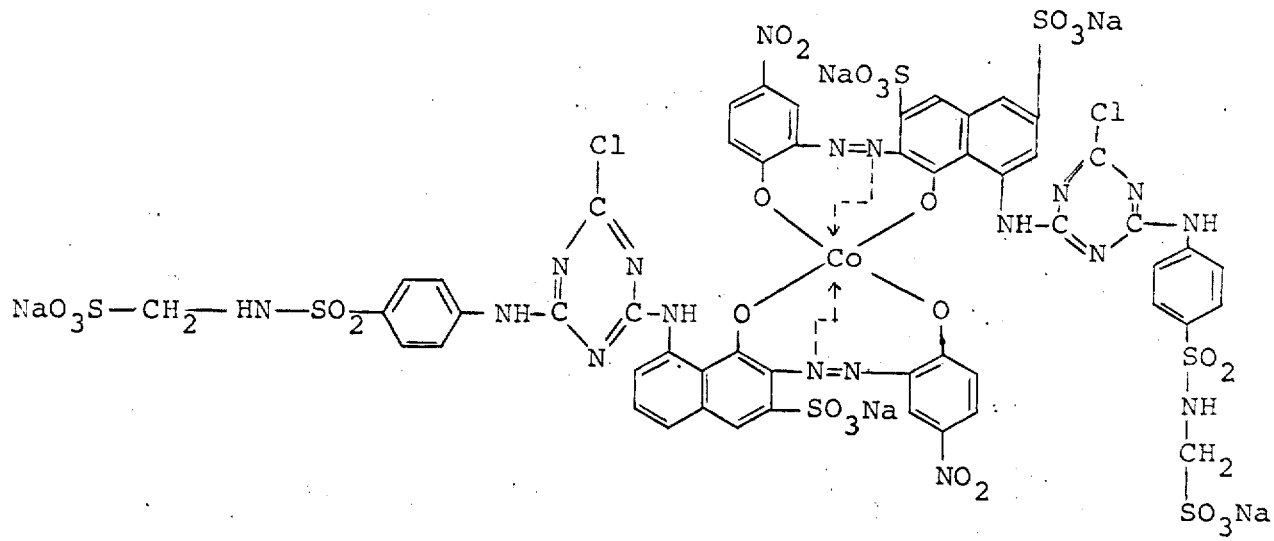

UNITED STATES PATENT OFFICE
CERTIFICATE OF CORRECTION

Patent No. 3,591,577　　　　　Dated July 6, 1971

Inventor(s) UGO MOISO et al　　　　PAGE - 5

It is certified that error appears in the above-identified patent and that said Letters Patent are hereby corrected as shown below:

Claim 4, the structural formula should read:

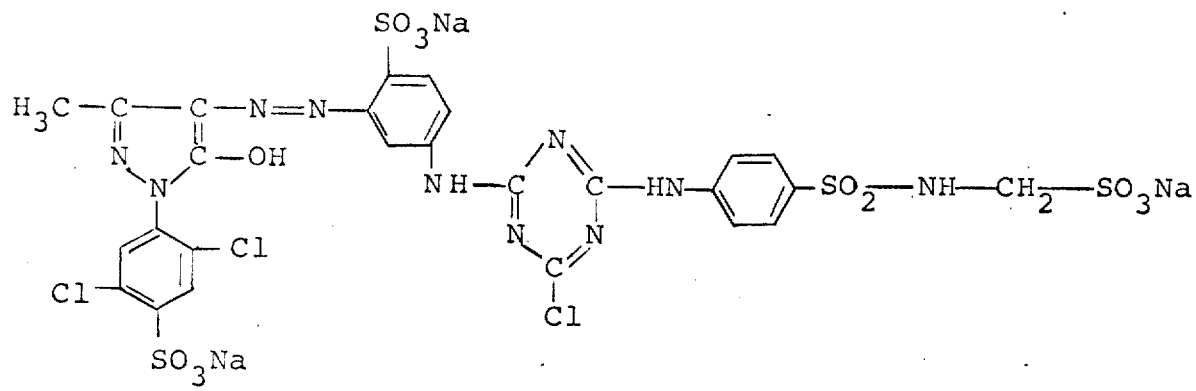

Claim 5, the structural formula should read:

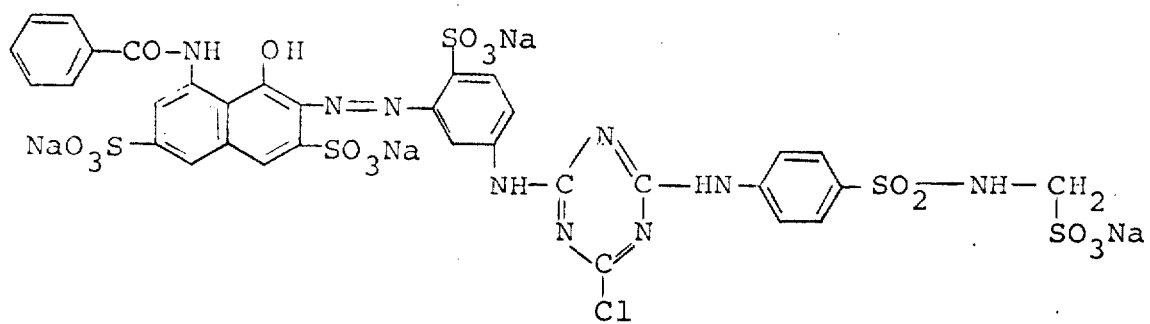

UNITED STATES PATENT OFFICE
CERTIFICATE OF CORRECTION

Patent No. 3,591,577  Dated July 6, 1971

Inventor(s) UGO MOISO et al    PAGE - 6

It is certified that error appears in the above-identified patent and that said Letters Patent are hereby corrected as shown below:

Column 11, first structural formula should read:

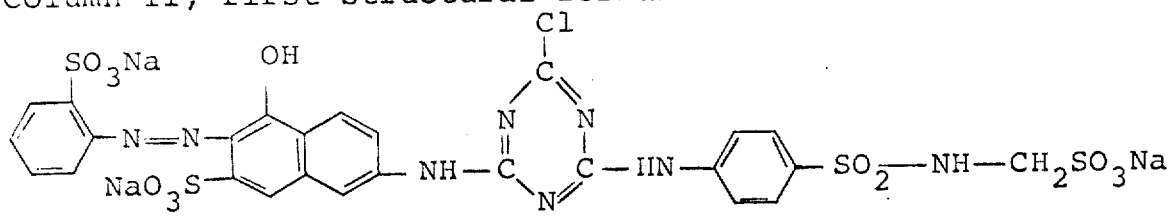

Claim 2, the structural formula should read:

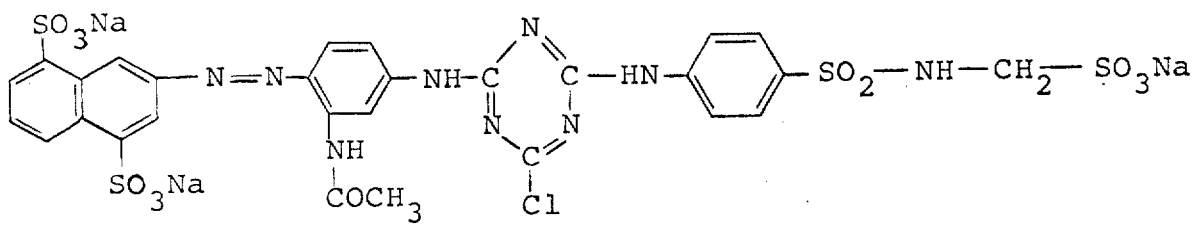

Claim 3, the structural formula should read:

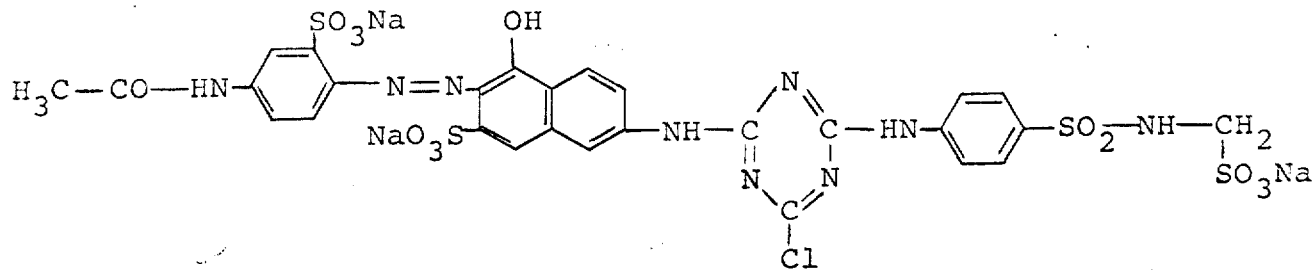

UNITED STATES PATENT OFFICE
CERTIFICATE OF CORRECTION

Patent No. 3,591,577  Dated July 6, 1971

Inventor(s) UGO MOISO et al     PAGE - 7

It is certified that error appears in the above-identified patent and that said Letters Patent are hereby corrected as shown below:

Claim 6, the structural formula should read:

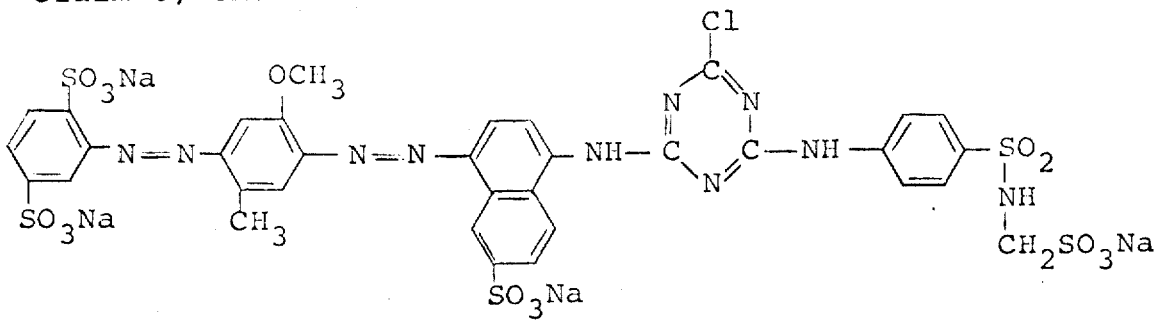

Claim 7, the structural formula should read:

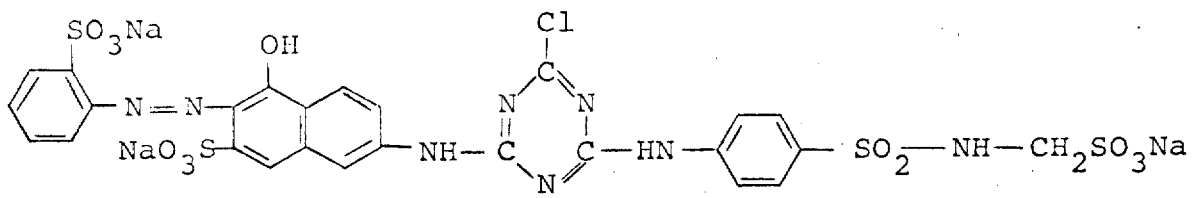

Signed and sealed this 15th day of August 1972.

(SEAL)
Attest:

EDWARD M. FLETCHER, JR.　　　　ROBERT GOTTSCHALK
Attesting Officer　　　　　　　　Commissioner of Patents